United States Patent [19]

Teitel

[11] Patent Number: 5,059,499

[45] Date of Patent: Oct. 22, 1991

[54] MASTER HOLOGRAM AND MICROPATTERN REPLICATION METHOD

[76] Inventor: Michael Teitel, 1039 Massachusetts Ave. #4B, Cambridge, Mass. 02138

[21] Appl. No.: 202,579

[22] Filed: Jun. 3, 1988

[51] Int. Cl.$^5$ ............................................. G03H 1/04
[52] U.S. Cl. ........................................ 430/1; 430/2; 430/212; 430/236; 430/270; 430/296; 430/320; 430/321; 430/323; 430/341; 430/344; 430/335; 430/375; 430/542; 430/559; 430/564; 430/942; 430/945; 156/654; 156/656; 156/664; 359/3; 359/12; 359/22

[58] Field of Search ............... 430/1, 2, 220, 323, 430/270, 212, 236, 296, 320, 321, 341, 344, 335, 375, 542, 559, 564, 945, 942; 350/3.6, 3.61, 3.75; 156/654, 656, 664

[56] References Cited

U.S. PATENT DOCUMENTS

| | | | |
|---|---|---|---|
| 3,733,258 | 5/1973 | Hanak et al. | 204/192 |
| 3,944,420 | 3/1976 | Gale et al. | 96/36 |
| 3,983,529 | 9/1976 | Langlois | 73/605 |
| 4,052,211 | 10/1977 | Inoue et al. | 430/926 |
| 4,056,395 | 11/1977 | Sato et al. | 96/36 |
| 4,343,874 | 8/1982 | Haines | 430/1 |
| 4,859,548 | 8/1989 | Heise et al. | 430/1 |

OTHER PUBLICATIONS

Humphrey's Journal, vol. IV, No. 10, Sep. 1, 1852, pp. 145-147 "New Process for Fixing the Image on the Plate".
Undated Humphrey's Journal, pp. 171-173 of Gaudin "Process for Taking Engravings from Daguerreotypes".
Daguerreian Journal, vol. 1, No. 8, Mar. 1, 1851 "Etching Daguerreotype Plates", of W. R. Groves.
"A Practical Description of the Process Called the Daguerreotype", pp. 63-80.

Primary Examiner—Ellis P. Robinson
Assistant Examiner—Donald J. Loney
Attorney, Agent, or Firm—Lahive & Cockfield

[57] ABSTRACT

A hologram is directly recorded in a sensitized metal substrate. The hologram may be an amplitude hologram, or may be treated to produce a phase relief hologram which may be stamped into a plastic material for reproduction, be archivally stored, or used as a master for electroforming a second durable surface relief hologram for use as an embossing master. A suitable material is prepared from a polished silver plate exposed to halogen vapors. After exposure, the plate is developed and fixed, and the surface is differentially etched to form a surface relief suitable for hologram embossing. Daguerreotype processes are modified to make surface amplitude holograms and phase holograms. By etching through a metal film a semiconductor mask is obtained. By depositing a silver film directly on a wafer, masks are made with very high feature definition.

17 Claims, 2 Drawing Sheets

MASTER HOLOGRAM AND MICROPATTERN REPLICATION METHOD

BACKGROUND OF THE INVENTION

This invention relates to light sensitive materials used to record small patterns with coherent radiation, and to methods of producing relief patterns. In particular, this invention relates to the recording of a phase relief hologram in a durable substrate which can be archivally stored or used as a master for replication by electroforming or embossing. This invention also relates to the recording of amplitude holograms. More generally, the present invention relates to recording of an information-bearing radiation field, and in particular to processes for such recording on a durable medium and wherein the radiation field has a characteristic feature size of below approximately one micron. Examples of such applications include the recording of holograms, semiconductor microlithography, and computer generated holography.

The general method for producing a phase relief hologram of the prior art consists of several steps. First, a photosensitive material is exposed to a light intensity field formed by the interference of two or more coherent beams of light. Often one of these beams is a reference source and one of these beams is modulated by an information signal. The photosensitive material is generally a photoresist, such as Shipley AZ1350J sold by the Shipley Company of Newton, Mass. This class of photosensitive materials are not very sensitive to light, and can require exposure times of 30 minutes or more using the 457.9 nm line of an 18-watt argon laser to expose a 6"×6" hologram. After exposure, the surface of such a resist is developed to produce a surface relief pattern with a depth corresponding to the intensity of radiation at each point.

For mass production, it is generally desired to make a master hologram, which may be exposed using a laser source having a wavelength such as 514 nm (argon ion), a 633 nm (HeNe), a 647.1 nm (Kr ion) or other wavelengths such as produced by a ruby crystal laser. For such wavelengths, photographic emulsions such as Agfa Gevaert 8E56HD or 8E75HD, are generally used. When such an emulsion is used, however, 457.9 nm illumination cannot be used for "reading" the hologram to record it in photoresist, because distortion problems due to the wavelength shift between the hologram recording wavelength and reconstruction of the master hologram at 457 nm make this impractical. Often the master hologram is made in Agfa 8E56HD film using the 488 nm or 476 nm line of the argon laser. Use of these wavelengths minimizes the wavelength shift problem, but the silver halide emulsion still introduces scatter noise. Sometimes the master hologram is recorded directly onto photoresist. This produces a first generation, high quality hologram, but is expensive and requires large lasers.

Generally, holograms recorded in materials such as silver halide/gelatin emulsions, dichromated gelatin, or photopolymer are subject to Bragg selection problems when the recording and playback geometries differ. These problems arise due to the thickness of the recording material.

OBJECTS AND SUMMARY OF THE INVENTION

It is an object of the invention to provide a surface hologram suitable for direct replication by embossing or the like.

It is another object of the invention to provide an amplitude hologram free of Bragg effects.

It is another object of the invention to provide a surface having a relatively high sensitivity over a broad band for forming a microscopic pattern.

These and other features of the invention are attained by sensitizing a metal surface and exposing the sensitized surface to coherent recording illumination. The exposed surface is developed and fixed to produce a master hologram or pattern localized at the surface, with the regions of the surface exposed to different intensities having different properties. The regions may have varying reflectance, or also have different chemical composition. When the development process varies the reflectance, this results in an amplitude hologram localized at the metal surface, and free of the Bragg effects characteristic of conventional holograms. In a further embodiment, the exposed surface is differentially etched to produce a surface relief pattern, and may be used as a master phase hologram. The master phase hologram may be used to emboss holograms in a mass production process, or may be replicated by electroforming techniques to make a daughter embossing master for production use. In a related process an exposed silver surface may have apertures etched therethrough to form a semiconductor mask.

A presently preferred practice of the method employs a polished silver-surface sheet which has been chemically photo-sensitized by a halogen. The surface is exposed to recording illumination and the sheet is then developed over mercury and the silver halide is removed by a fixer. The fixed sheet is toned, e.g., by a gold chloride treatment, to enhance contrast for use as an amplitude hologram, or is differentially etched to form a surface relief or phase hologram.

The processed sheet is then replicated or used directly to make daughter holograms, by an otherwise conventional embossing process.

BRIEF DESCRIPTION OF THE DRAWINGS

These and other features of the invention will be understood from the following description taken together with the drawings, wherein.

DETAILED DESCRIPTION OF ILLUSTRATED EMBODIMENTS

According to the present invention an information-bearing hologram or pattern is recorded directly on a polished sensitized surface, which is preferably sensitized by forming a metal halide or similar photosensitive salt thereon, such as used in Daguerreotype photography. The exposed surface is developed into a durable hard hologram which may be viewed directly as an amplitude hologram or may be etched to provide surface relief, thereby forming a phase hologram.

Figure 1:
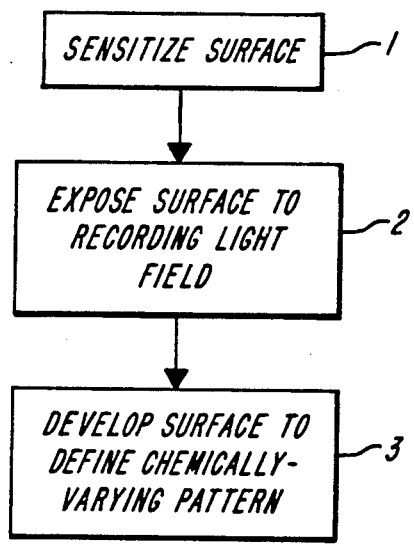
FIGS. 1 and 2 show the process steps for making a coherent light recording according to the invention, and for converting the recording to a phase hologram for replication.

As shown in FIG. 1, in a first step 1 the surface of a hard substrate is sensitized. As in Daguerre's original process, this can be accomplished by exposing a plate of highly polished silver to the vapors of iodine, bromine, chlorine or a combination of these elements. The halides react with the silver surface to form a thin coating of silver halide salt on the polished silver plate. This coating has significantly greater light sensitivity than a modern photoresist, which relies on photopolymerization for development. This material also has greater resolution than a standard silver halide/gelatin emulsion, since the resolution of a silver halide/gelatin emulsion is limited by the size of the silver halide crystals suspended in the gelatin. The limit of resolution of such a sensitized surface, referred to herein as a Daguerreotype, is substantially below the wavelength of light.

At step 2, the Daguerreotype plate is exposed to a pattern of coherent illumination. The energy of the light decomposes the silver halide salts into silver atoms and halogen atoms. The silver remains on the plate while the halogens disperse, so the exposed plate has a surface composition which varies in accordance with the exposed light.

In step 3, the exposed plate then developed. This may be done by exposing it to the vapor of mercury, so that the mercury amalgamates with the silver only in the areas of the plate which were exposed to light, i.e., in surface areas having at least some elemental silver. The areas which were not exposed remain as a silver halide coating over the silver plate. The developed plate may then be "fixed", e.g., by removing the silver halides with a solution such as sodium thiosulfate. At this point, a thin amplitude hologram has been recorded. When the hologram is reconstructed, light is diffracted as it would be by an amplitude diffraction grating, with the light-appearing areas being the reflective silver surface and the dark areas being the silver/mercury amalgam which scatters light.

In contrast to holograms recorded in standard photographic emulsions, which are actually volume recordings having holographic information recorded as a three dimensional fringe pattern extending through silver/gelatin emulsion layer, holograms recorded in this manner are true thin holograms and, in fact, have a surface relief substantially less than the thinnest holograms formed by conventional etching of a photoresist. These holograms do not suffer from Bragg selection effects, as the five micron or thicker holograms recorded in silver halide/gelatin emulsions do, because the recordings are essentially flat. The diffraction efficiency of a thin hologram or holographic optical element recorded according to the present invention is not sensitive to differences in recording and reconstruction geometries. Thus, this method allows complex holographic optical elements and holograms to be made without the calculation and recording of additional features to compensate for Bragg selection effects.

The hologram recording method just described does not form a coating over a surface, but transforms the surface itself to form an extremely thin photosensitive "skin" localized at the surface.

Figure 2:
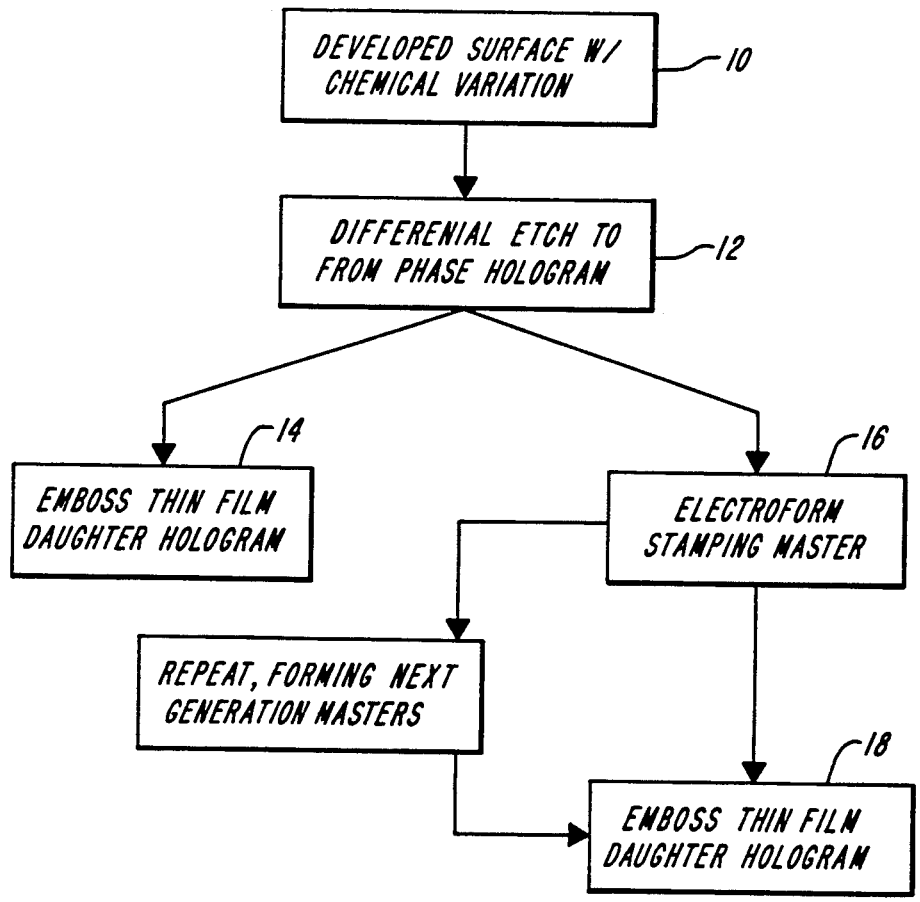

FIG. 2 illustrates further steps in the fabrication or reproduction of a hard thin hologram made according to FIG. 1. Step 10 starts with the developed hologram, having holographic information in the form of varying chemical composition, corresponding to an exposed Daguerreotype's surface reflectivity. At step 12, the amplitude hologram is then differentially etched by electroetching or by treating it with a reactive fluid or vapor which attacks the amalgamated portions of the developed image at a different rate than the unamalgamated portions. Preferably, the etch is controlled to obtain a total surface relief on the order of one quarter wavelength or a multiple thereof.

Following the etching, which converts the surface from an amplitude hologram to a phase hologram, the etched phase hologram may be used to manufacture copies of itself. This may be done by a process indicated generally at step 14, by pressing the hologram against a plastic film, thereby embossing the thin film with the surface contours of the etched hologram. Alternatively, the hologram etched in step 12 may have a hard metal layer, e.g. a nickel layer, deposited thereon by a process 16 such as electroforming, to produce a nickel sheet to serve as a stamping master. This sheet, when stripped, is then used as an embossing plate to reproduce phase holograms having the recorded interference pattern, as shown in step 18.

Thus, the etched hologram described above not only has very high feature resolution, but may serve directly as an emobossing plate, greatly facilitating the set up of, and testing of, commercial holograms.

By way of illustrative example, the general procedure for preparing a phase relief hologram on a silver substrate is described below. First, a polished silver plate is prepared. This plate can be solid silver, or may consist of a thin layer of silver deposited on another substrate, such as plastic, glass, metal or any other hard material. A suitable silver surface can be made by sputtering or vapor depositing the silver onto the substrate. The plate can be a flat two dimensional plate or it can be a smooth surface of a three dimensional shape. In prototype experiments, a coating of silver was electroplated over a substrate of sheet copper. The silver surface is then polished until it is mirror smooth.

The silver is then sensitized to light by exposing it to the vapor of one or more halogens. In the prototype, the halogens used are iodine and bromine. Chlorine or fluorine could also be used, although they are more difficult to handle safely. A three step coating procedure sensitizes the plates. The silver plate is coated over iodine vapors for two minutes in a coating apparatus consisting of a small box with a cutout in its lid for holding the silver plate. Iodine is placed in the box to fill the box with iodine vapor. The coating box is kept covered so that the vapor pressure of the halide remains high inside. The plate is then placed in a similar box with a bromine vapors for one minute. The bromine coating box has a tray with weak bromine water, which is prepared by diluting saturated bromine water 8:1 with distilled water. The plate is then returned to the first box and coated with iodine for thirty seconds. The coating times may vary with temperature, humidity and the condition of the coating boxes, but the indicated times are a good starting point which can readily be adjusted for the conditions of the day. Other coating procedures from the photographic literature may be employed.

The light sensitive plate prepared in this manner is substantially similar to one sort of plate used for Daguerrian photography. The exposed plate of this embodiment of the invention differs from a Daguerreotype plate in that the present plate is exposed to the information bearing pattern formed by the interference of two or more light fields, or is exposed to a modulated feature defining scanning beam of microscopic dimension, instead of to the image from a camera obsura such as was used in the nineteenth century. Exposures of five to ten thousand ergs per square centimeter have produced good holographic diffraction recordings.

The exposed plate is then developed. For the prototype holograms, developing apparatus similar to the ones used in the 1840's was used. Mercury is heated to 170° F. in the bottom of a closed box in which the silver plate sets for a processing time between ten and fifteen minutes. After being developed over mercury, the plate is immersed in a solution of sodium thiosulfate or other photographic fixer to remove remaining silver halides from the surface of the plate. At this point if the recording is to be a thin amplitude hologram, it can be gilt with gold chloride to enhance contrast and then dried. Otherwise, if the hologram is to be a phase relief hologram it is differentially etched.

The holographic fringe pattern of the developed hologram consists of a silver surface with mercury/silver amalgam in the exposed areas. In order to make a phase relief hologram from this, silver is removed without removing the silver mercury amalgam. To achieve such differential etching an acid etch such as described in the article by Grove in the Daguerrian Journal, Vol. 1, No. 8, pp. 225-229 may be used. Other processes, many of which were used in unsuccessful nineteenth century attempts to achieve an inkable offset plate from a Daguerreotype plate, may be used. Positive or negative etch processes may be selected.

Figure 3A:
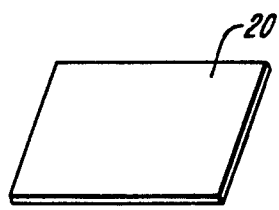
FIGS. 3(a)–3(e) show a substrate and hologram formed therefrom according to one preferred embodiment of the invention, at representative stages illustrated in FIGS. 1 and 2.
Figure 3B:
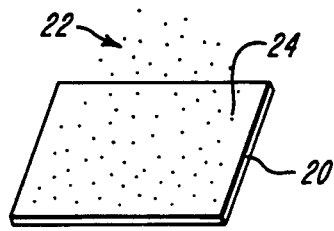
Figure 3C:
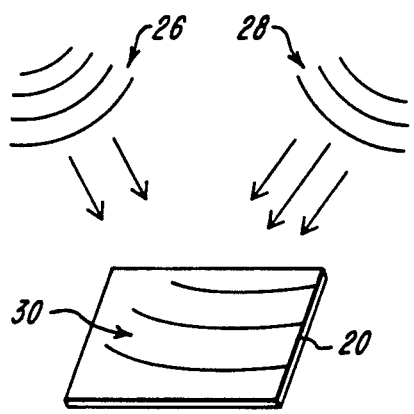
Figure 3D:
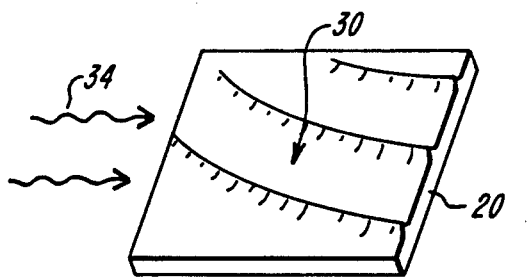
Figure 3E:
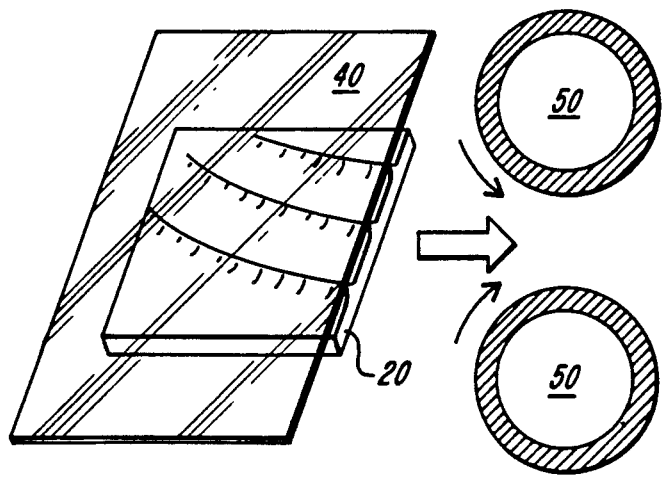

FIGS. 3(a)-3(d) illustrate the above described steps of forming surface relief pattern localized at an optically smooth surface, and FIG. 3(e) illustrates the replication of such surface relief pattern to form, for example, a hologram copy.

At 3(a) a metal-surfaced plate 20 is shown before sensitization. Plate 20 may be an arbitrary shape, so long as it is smooth. While holography and microlithography are conventionally performed on flat surfaces, it may, for example, be desirable to form a holographic fringe pattern on a curved or irregular surface to achieve a particular desired fringe pattern. In FIG. 3(b) the plate 20 is exposed to chemical reactants 22 to form a chemically photosensitized surface 24. Other chemical process steps such as a dye bonding step may be performed to achieve enhanced sensitivity to a particular wavelength, or to stabilize the treated plate for storage.

In FIG. 3(c), the sensitized plate is exposed to a light field, shown as comprising first and second coherent beams 26, 28 which interfere to form an illumination field of varying amplitude on the sensitized surface. This exposure forms a pattern of varying chemical properties 30 on the surface. In FIG. 3(d), the exposed plate is treated by a development and etching process 34 so that pattern 30 becomes a surface relief pattern of depth greater than approximately one quarter wavelength. A total variation of surface relief between one hundred and one thousand nanometers is contemplated, with the greater relief depths corresponding to longer wavelengths and to certain embossing applications which require high surface relief.

In the described example, the development process consists of a fixing, washing and surface stabilization or toning of a classical Daguereotype procedure. It will be understood, however, that when an amplitude hologram is not the desired end product development in the sense of forming a viewable light image is unnecessary, and thus development may consist of any process which enhances the susceptibility of a portion of the pattern to etching. The etch may be performed by any suitable process, including plasma or ion beam etching, fluid or vapor acid etching, electroetching or the like.

Finally, at FIG. 3(e), a representative embossing process is illustrated, wherein the etched plate 20 is pressed against a film 40 by passing it between opposed pressure rollers 50. Other methods of reproducing the surface relief pattern may be employed, including electrodeposition of a metal film thereon, pressure and heat forming of a surface pattern as practiced in pressing compact discs, or the coating of a liquid medium onto the patterned surface followed by hardening of the medium to produce a durable copy. Such hardening may be affected by heat or ultraviolet-induced polymerization of the medium in a conventional fashion. Other methods for reproducing the metal surface relief pattern will occur to those skilled in the art.

According to another aspect of the invention, a hologram as described above is formed by a closely related process, wherein the exposing step is carried out by exposing the sensitized surface to a computer-controlled scanning beam, thereby forming a computer-generated hologram pattern. The remaining steps of developing, etching and replicating are identical to those described above.

According to yet another aspect of the invention, a high resolution pattern mask is formed in a substantially similar set of process steps, by exposing a sensitized metal surface to a pattern of radiation, and differentially etching entirely through the exposed surface to obtain a mask. For this application, the substrate may be a transparent plate, such as a glass cover slip with the metal layer deposited thereon. The metal is sensitized as before. The exposure radiation may comprise ultraviolet light, an electron beam, or the like. The resulting patterned metal (e.g., silver) film having apertures therethrough is used as a contact mask to expose a semiconductor wafer to a high resolution circuit-element-defining pattern. In a preferred embodiment of this aspect of the invention, the mask is made by forming a silver film directly on a semiconductor wafer, then photosensitizing, exposing, and etching the film to define the mask. Following deposition of a dopant or other material, or etching of the wafer through apertures in the mask thus formed, the silver may be dissolved from the wafer or further used as a conductive layer.

It will be appreciated that in describing a hologram according to the invention a specific silver/silver-halide system, for which many related toning and etching or other treatment processes are known, has been chosen for clarity of illustration, but that such example is not intended to limit the scope of the invention. The method of creating a high resolution pattern localized at a surface, such as a pure surface hologram, and the method of transforming it to a replicable phase hologram or mask being thus described, other variations and modifications of the invention will occur to those of ordinary skill in the art, and all such variations and modifications are included within the scope of the invention, as set forth in the claims which follow.

What is claimed is:

1. A method of recording a hologram light pattern so as to make a master pattern having a surface relief suitable for direct replication by embossing, such method comprising the steps of:

(i) recording the light pattern onto a silver surface which has been chemically sensitized by reaction with a halogen to form a silver halide, said recording being performed by exposing the silver halide to a pattern of interfering coherent light to dissociate the silver halide in a corresponding pattern in exposed regions of the surface, and (ii) differentially etching the surface to produce a surface contour of enhanced relief dimensions suitable for the direct embossing of phase hologram copies of the recorded light pattern.

2. The method of claim 1, wherein said step of differentially etching includes etching to a relief depth which is a multiple of approximately one quarter wavelength of the interfering coherent light.

3. The method of claim 1, wherein the step of recording includes exposing a Daguerreotype plate to an interference pattern generated by overlapping recording beams derived from a coherent source.

4. A method of recording a microscopic surface relief pattern corresponding to the amplitude of a radiation field of interfering coherent waves, such surface relief pattern having variations of surface height below approximately one micron, wherein the method comprises the steps of (A) providing a field of interfering coherent waves (B) providing a smooth silver surface, and (i) chemically sensitizing the silver surface to radiation by reaction with a halogen to form a silver halide at said surface and subsequently (ii) exposing the surface to said field of interfering coherent waves so as to dissociate the silver halide and thereby form a chemically varying surface distribution in a pattern corresponding to variations in amplitude of said field and (iii) selectively removing material from said surface by differentially etching said chemically varying surface distribution to achieve a corresponding pattern having differential surface relief which transforms the phase of coherent light reflected from said surface in accordance with the interfering coherent waves.

5. The method of claim 4, wherein said step of chemically sensitizing includes sensitizing to a surface depth of under one micron.

6. The method of claim 4, wherein said step of selectively removing includes etching to a depth of greater than approximately one hundred nanometers.

7. The method of claim 4, wherein said step of selectively removing includes exposing the surface to mercury or gallium.

8. The method of claim 4, wherein the step of exposing includes scanning the surface with an electron beam or electromagnetic radiation.

9. The method of claim 4, wherein the step of sensitizing includes sensitizing with a dye to vary the spectral sensitivity of said surface.

10. The method of claim 4, wherein the radiation field is produced by optically reducing a macroscopic image.

11. The method of claim 10, wherein the radiation field is produced by a semiconductor mask fabrication or by computer generated hologram reduction process.

12. The method of claim 4, further comprising the step of reproducing the surface relief pattern on a separate surface.

13. The method of claim 12, wherein said step of reproducing includes electroforming or embossing.

14. The method of claim 12, wherein the step of reproducing includes (i) contacting said surface with a substrate conformable to said relief pattern;

(ii) causing said substrate to harden in a shape conforming to said relief pattern, and (iii) separating said substrate from said surface so that the surface of said substrate reproduces the relief pattern.

15. A method of making a holographic pressing master for embossing a desired phase hologram such method comprising the steps of:

(i) providing a polished silver plate, (ii) sensitizing the plate by chemically reacting a halogen at the surface thereof to form a photodissociable halogen salt at the surface (iii) exposing the sensitized plate to a coherent light field to dissociate the silver halide in exposed areas and thereby vary the surface composition of the silver plate in accordance with the amplitude of said coherent light field over the surface, and (iv) etching the plate with an etchant which differentially etches different portions of said varying surface composition to produce a relief modulated surface corresponding to said desired phase hologram, said etching being carried out to a relief depth sufficient for embossing phase hologram copies therefrom.

16. A method of recording a pattern of electromagnetic radiation so as to make a master pattern having a surface for modulating electromagnetic radiation in accordance with said master pattern, such method comprising the steps of (i) providing a substrate having a smooth silver surface, (ii) chemically treating the surface to form a radiation sensitive silver halide skin thereon by chemical reaction of a halogen with the silver surface, (iii) exposing said skin to a recording pattern of said electromagnetic radiation, and (iv) further treating the exposed skin to remove an effective amount of material therefrom to form said master pattern for phase modulating electromagnetic radiation directed thereat.

17. The method of claim 16, wherein said pattern of electromagnetic radiation comprises a hologram recording pattern, and wherein said step of further treating includes differentially etching to produce a master pattern having an amount of surface relief suitable for use in molding or pressing to mechanically reproduce phase hologram copies.

* * * * *